US011750971B2

(12) United States Patent
Jung et al.

(10) Patent No.: US 11,750,971 B2
(45) Date of Patent: Sep. 5, 2023

(54) THREE-DIMENSIONAL SOUND LOCALIZATION METHOD, ELECTRONIC DEVICE AND COMPUTER READABLE STORAGE

(71) Applicant: Nanning FuLian FuGui Precision Industrial Co., Ltd., Nanning (CN)

(72) Inventors: Chen-Hsuan Jung, New Taipei (TW); Teng-Shuo Chang, New Taipei (TW); Kai-Xian Zheng, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 232 days.

(21) Appl. No.: 17/198,644

(22) Filed: Mar. 11, 2021

(65) Prior Publication Data
US 2022/0295177 A1 Sep. 15, 2022

(51) Int. Cl.
*H04R 3/00* (2006.01)
*H04S 7/00* (2006.01)
(52) U.S. Cl.
CPC ............ *H04R 3/005* (2013.01); *H04S 7/301* (2013.01); *H04S 2400/01* (2013.01); *H04S 2420/01* (2013.01)

(58) Field of Classification Search
CPC ...... H04R 3/005; H04R 2430/20; H04S 7/301; H04S 2400/01; H04S 2420/01; G01S 3/80
See application file for complete search history.

(56) References Cited

U.S. PATENT DOCUMENTS

2017/0208292 A1    7/2017 Smits

FOREIGN PATENT DOCUMENTS

| CN | 1307791 A | 8/2001 |
| CN | 103064061 A | 4/2013 |
| TW | 201436588 A | 9/2014 |

*Primary Examiner* — Ping Lee
(74) *Attorney, Agent, or Firm* — ScienBiziP, P.C.

(57) ABSTRACT

A three-dimensional (3D) sound localization method, comprising: evaluating distances between a target object and multiple microphones; distinguishing a quadrant in which the target object is located; evaluating multiple elevation angles and azimuth angles of the target object according to spatial coordinates of each of the microphones; setting searching intervals of distance variables between the target object and each of the microphones; generating multiple test points according to the elevation angles, the azimuth angles and the searching intervals of the distance variables; calculating fitness of each of the test points; obtaining fitness values of each of the test points and comparing the fitness values between each of the test points; and, when a convergence condition is reached according to the fitness values, generating a positioning result of the target object.

18 Claims, 9 Drawing Sheets

THREE-DIMENSIONAL SOUND LOCALIZATION METHOD, ELECTRONIC DEVICE AND COMPUTER READABLE STORAGE

BACKGROUND

1. Technical Field

The disclosure relates to a positioning method, and more particularly to a three-dimensional (3D) sound localization method, electronic device and computer readable storage medium.

2. Description of Related Art

In the development of voice-related technologies, the analysis accuracy and processing efficiency should be improved is a clearer voice input quality. In view of the improvement of the voice quality, locating a sound source is a factor first to be considered.

Many sound source localization methods are well known and provided. However, in real space, sound waves are transmitted non-linearly. To locate sound source coordinates, it is necessary to analyze a nonlinear model and, therefore, a large amount of calculations are required for motion analysis of the nonlinear model, which becomes an obstacle to real-time feedback.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

Figure 1:
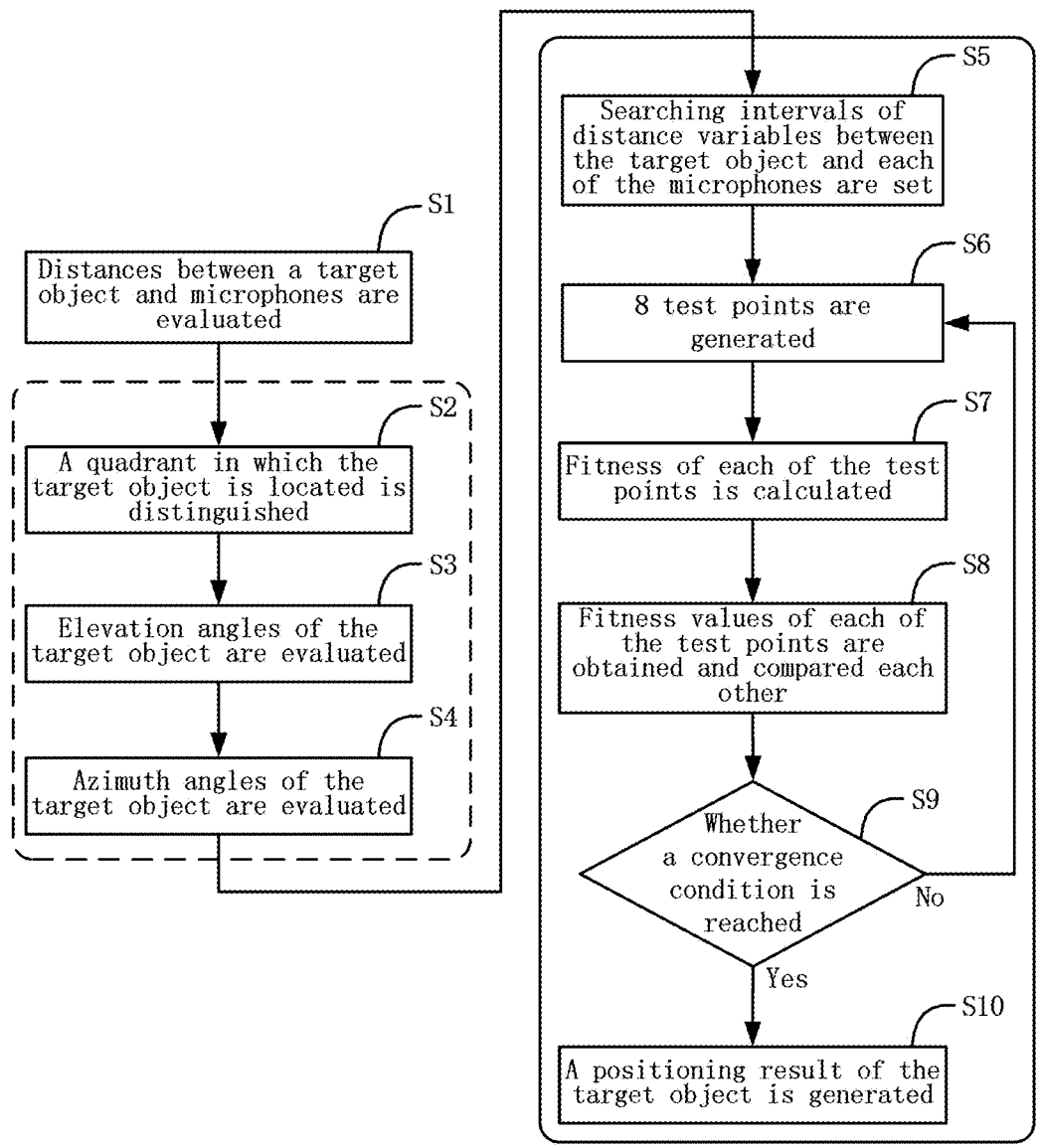
FIG. 1 is a flowchart of an embodiment of a three-dimensional (3D) sound localization method of the preset disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be preset.

The term "comprising," when utilized, means "including, but not necessarily limited to"; it specifically indicates open-ended inclusion or membership in the so-described combination, group, series, and the like.

The three-dimensional (3D) sound localization method of an embodiment of the present disclosure achieves localization of a target object providing a sound source via multiple sets of miniature stereo microphones, comprising: calculating incidence angles of the target object relative to the center of the microphone sets in a spherical coordinate system in the 3D space, and adopts fast convergence for a single extreme value to search along possible three-dimensional intervals established in the 3D space of estimated angles according to a calculation result for previous angles, thereby achieving the localization result.

FIG. 1 is a flowchart of an embodiment of a three-dimensional (3D) sound localization method of the preset disclosure. The order of the steps in the flowchart can be changed and some steps can be omitted according to different requirements.

In block S1, distances between a target object and at least one set of miniature stereo microphones are evaluated. The set of the miniature stereo microphones comprise at least 3 miniature stereo microphones. In this embodiment, 6 microphones are used and spatial coordinates thereof comprise mic1(R,0,0), mic2(−R,0,0), mic3(0,R,0), mic4(0,−R,0), mic5(0,0, R) and mic6(0,0,−R).

In block S2, a quadrant in which the target object is located is distinguished, which determines where the target object is.

Figure 4:
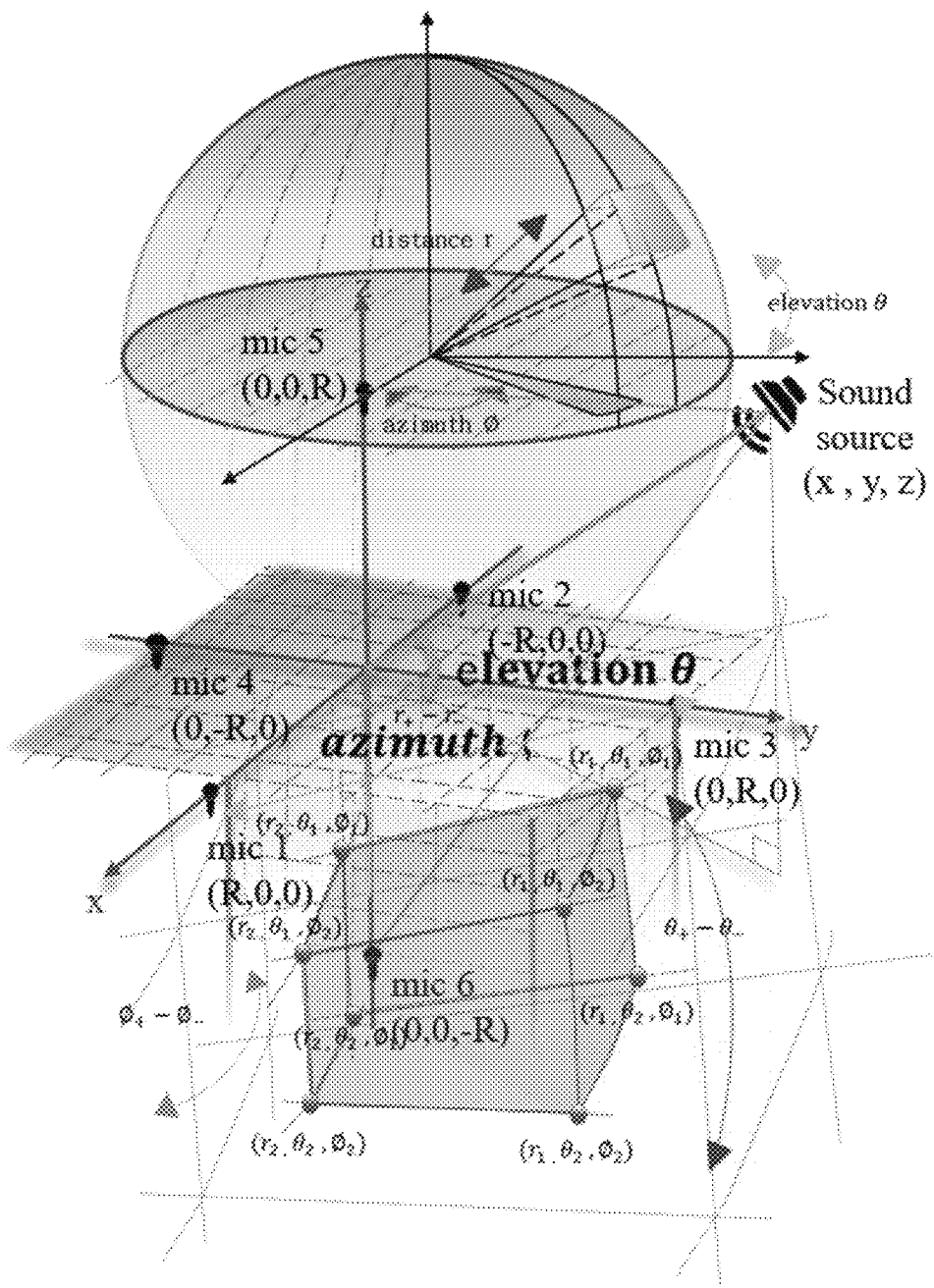
FIG. 4 is a schematic diagram of an embodiment of an application of the 3D sound localization of the preset disclosure.

In block S3, elevation angles (elevation θ) of the target object are evaluated according to the spatial coordinates of the microphones using the formula (1), and the error of each of the elevation angles is between plus and minus 5 degrees ($\theta_{estimated}\pm 0.5°$), as shown in FIG. 4. The formula (1) is represented as:

$$\theta_{ele} = \cos^{-1}\left(\sqrt{1 - \left(\frac{D_{mic_m-source} - D_{mic_n-source}}{D_{mic_m-mic_n}}\right)^2}\right), \quad (1)$$

wherein D represents a distance between the target object and each of the miniature stereo microphones, m>0 and n>0.

In block S4, azimuth angles (azimuth φ) of the target object are evaluated according to the spatial coordinates of the microphones using the formula (2), and the error of each of the azimuth angles is between plus and minus 5 degrees ($\phi_{estimated\pm 0.5°}$), as shown in FIG. 4. The formula (2) is represented as:

$$\phi_{azi} = \cos^{-1}\left(\frac{\cos\left(90 - \cos^{-1}\left(\sqrt{1 - \left(\frac{D_{mic_m-source} - D_{mic_n-source}}{D_{mlc_m mlc_n}}\right)^2}\right)\right)}{\cos(\theta_{ele})}\right), \quad (2)$$

wherein D represents a distance between the target object and each of the miniature stereo microphones, m>0 and n>0.

In block S5, searching intervals of distance variables between the target object and each of the microphones are set, for example, r:[1 m 8 m].

Figure 5:
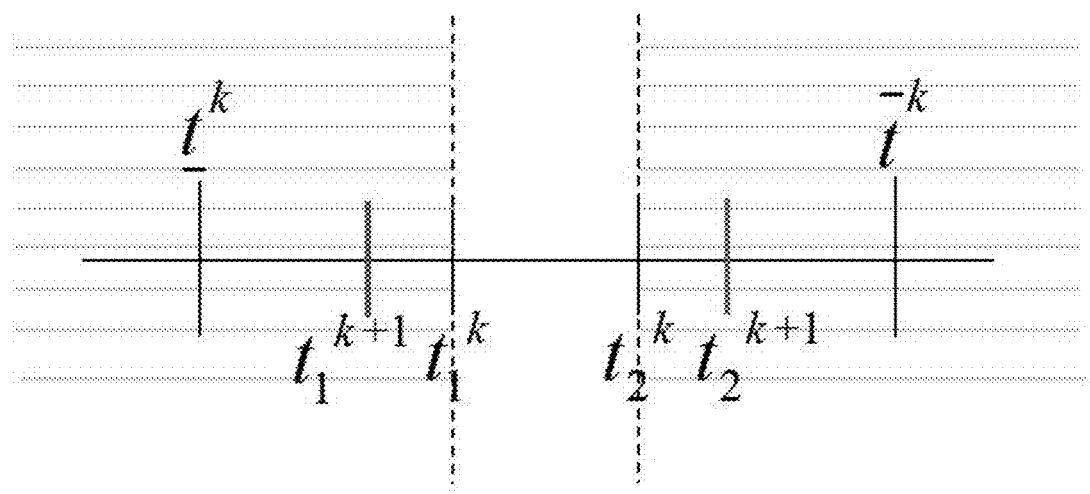
FIG. 5 is a schematic diagram of an embodiment of an upper bound and a lower bound adapted for discovering test points of the preset disclosure.
Figure 6:
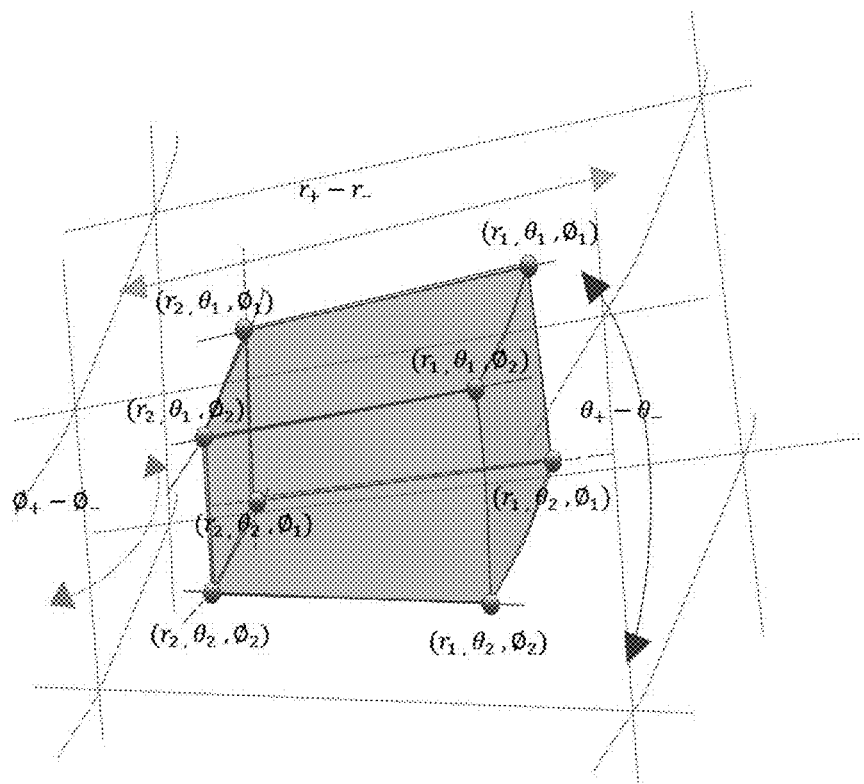
FIG. 6 is a schematic diagram of an embodiment of generating the test points of the preset disclosure.

In block S6, multiple test points, for example, 8 test points, are generated according to the elevation angles, the azimuth angles and the searching intervals of the distance variables using the formulas (3) and (4), comprising ($r_1$, $\theta_1$, $\phi_1$), ($r_1$, $\theta_1$, $\phi_2$), ($r_1$, $\theta_2$, $\phi_1$), ($r_1$, $\theta_2$, $\phi_2$), ($r_2$, $\theta_1$, $\phi_1$), ($r_2$, $\theta_1$, $\phi_2$), ($r_2$, $\theta_2$, $\phi_1$), and ($r_2$, $\theta_2$, $\phi_2$), as shown in FIG. 4 and FIG. 6. The formulas (3) and (4) are represented as:

$$L(\underline{t}^k, \overline{t}^k, t_1^k, t_2^k) \equiv \begin{cases} \underline{t}^{k+1} = \overline{t}^k, \overline{t}^{k+1} = t_2^k, t_2^{k+1} = t_1^k \\ t_1^{k+1} = \overline{t}^{k+1} - 0.618(\overline{t}^{k+1} - \underline{t}^{k+1}) \end{cases}, \quad (3)$$

and $$U(\underline{t}^k, \overline{t}^k, t_1^k, t_2^k) \equiv \begin{cases} \underline{t}^{k+1} = t_1^k, \overline{t}^{k+1} = \overline{t}^k, t_1^{k+1} = t_2^k \\ t_2^{k+1} = \underline{t}^{k+1} + 0.618(\overline{t}^{k+1} - \underline{t}^{k+1}) \end{cases}, \quad (4)$$

wherein $\underline{t}^k$ and $\overline{t}^k$ are the upper bound and the lower bound of the searching interval under the k times searching, and $t_1^k$ and $t_2^k$ are the test points of the searching interval under the k times searching, as shown in FIG. 5.

In block S7, fitness of each of the test points is calculated using the formula (5). The formula (5) is represented as:

$$error_1 = \frac{\sqrt{(x-x_1)^2 + (y-y_1)^2 + (z-z_1)^2} - \sqrt{(x-x_1)^2 + (y-y_1)^2 + (z-z_1)^2}}{v_{sound}} - \tau_{12}. \quad (5)$$

In block S8, fitness values (fitness value=min(f (x, y))) of each of the test points are obtained using the formula (6) and the fitness values are compared each other. The formula (6) is represented as:

$$f(x, y) = \text{sum}(\text{abs}(error)) \quad (6)$$

In block S9, it is determined whether a convergence condition is reached according to the fitness values of each of the test points, and, if not, the process proceeds to step S6 and steps S6 to S8 are repeated.

In block S10, if the convergence condition is reached, a positioning result of the target object is generated.

Figure 2:
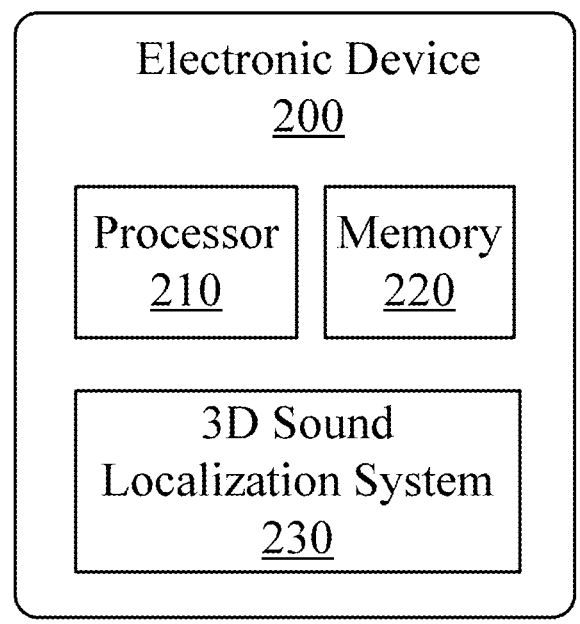
FIG. 2 is a block diagram of an embodiment of the hardware architecture of an electronic device using the method of the preset disclosure.

FIG. 2 is a block diagram of an embodiment of the hardware architecture of an electronic device using the method of the preset disclosure. The electronic device 200 may, but is not limited to, connect to a processor 210, a memory 220, and a 3D sound localization system 230 via system buses. The electronic device 200 shown in FIG. 2 may include more or fewer components than those illustrated, or may combine certain components.

The memory 220 stores a computer program, such as the 3D sound localization system 230, which is executable by the processor 210. When the processor 210 executes the 3D sound localization system 230, the blocks in one embodiment of the 3D sound localization method applied in the electronic device 200 are implemented, such as blocks S1 to S10 shown in FIG. 1.

It will be understood by those skilled in the art that FIG. 2 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the 3D sound localization system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The 3D sound localization system 230 can be partitioned into one or more modules/units that are stored in the memory 220 and executed by the processor 210.

The one or more modules/units may be a series of computer program instructions capable of performing particular functions of the 3D sound localization system 230.

Figure 3:
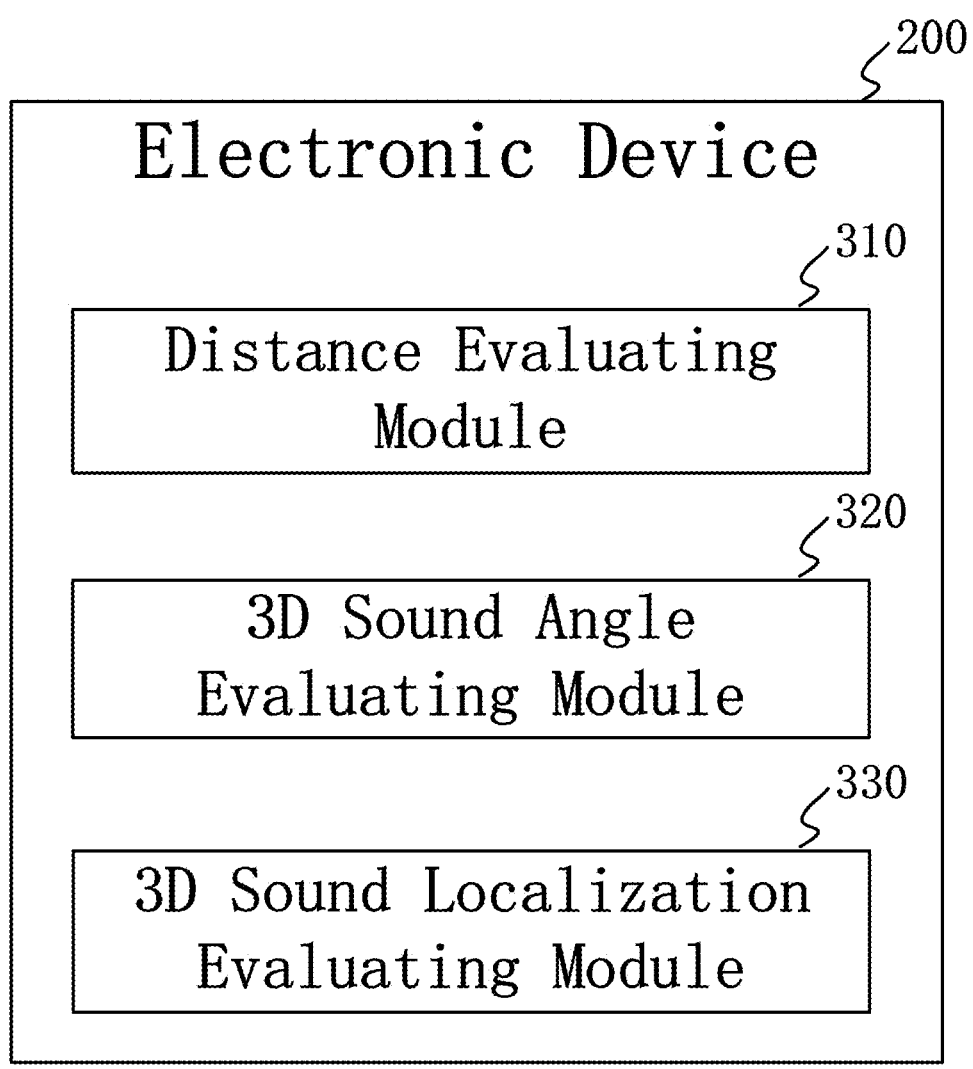
FIG. 3 is a schematic diagram of functional blocks of the electronic device using the method according to an embodiment of the preset disclosure.

FIG. 3 is a schematic diagram of functional blocks of the electronic device using the method according to an embodiment of the preset disclosure.

The electronic device 200 comprises a distance evaluating module 310, a 3D sound angle evaluating module 320 and a 3D sound localization evaluating module 330.

The distance evaluating module 310 evaluates distances between a target object and at least one set of miniature stereo microphones. The set of the miniature stereo microphones comprise at least 3 miniature stereo microphones. In this embodiment, 6 microphones are used and spatial coordinates thereof comprise mic1(R,0,0), mic2(-R,0,0), mic3(0,R,0), mic4(0,-R,0), mic5(0,0,R) and mic6(0,0,-R).

The 3D sound angle evaluating module 320 distinguishes a quadrant in which the target object is located, which determines where the target object is.

The 3D sound angle evaluating module 320 evaluates elevation angles (elevation θ) of the target object according to the spatial coordinates of the microphones using the formula (1), and the error of each of the elevation angles is between plus and minus 5 degrees ($\theta_{estimated\pm 0.5°}$), as shown in FIG. 4. The formula (1) is represented as:

$$\theta_{ele} = \cos^{-1}\left(\sqrt{1 - \left(\frac{D_{mic_m-source} - D_{mic_n-source}}{D_{mic_m-mic_n}}\right)^2}\right), \quad (1)$$

wherein D represents a distance between the target object and each of the miniature stereo microphones, m>0 and n>0.

The 3D sound angle evaluating module 320 evaluates azimuth angles (azimuth φ) of the target object according to the spatial coordinates of the microphones using the formula (2), and the error of each of the azimuth angles is between plus and minus 5 degrees ($\phi_{estimated} \pm 0.5°$), as shown in FIG. 4. The formula (2) is represented as:

$$\phi_{azi} = \cos^{-1}\left(\frac{\cos\left(90 - \cos^{-1}\left(\sqrt{1 - \left(\frac{D_{mic_m-source} - D_{mic_n-source}}{D_{mic_m-mic_n}}\right)^2}\right)\right)}{\cos(\theta_{ele})}\right), \quad (2)$$

wherein D represents a distance between the target object and each of the miniature stereo microphones, m>0 and n>0.

The 3D sound localization evaluating module 330 sets searching intervals of distance variables between the target object and each of the microphones, for example, r:[1 m 8 m].

The 3D sound localization evaluating module 330 generates 8 test points according to the elevation angles, the azimuth angles and the searching intervals of the distance variables using the formulas (3) and (4). The test points comprises $(r_1, \theta_1, \phi_1), (r_1, \theta_1, \phi_2), (r_1, \theta_2, \phi_1), (r_1, \theta_2, \phi_2), (r_2, \theta_1, \phi_1), (r_2, \theta_1, \phi_2), (r_2, \theta_2, \phi_1)$, and $(r_2, \theta_2, \phi_2)$ as shown in FIG. 4 and FIG. 6. The formulas (3) and (4) are represented as:

$$L(\underline{t}^k, \overline{t}^k, t_1^k, t_2^k) \equiv \begin{pmatrix} \underline{t}^{k+1} = \underline{t}^k, \overline{t}^{k+1} = t_2^k, t_2^{k+1} = t_1^k \\ t_1^{k+1} = \overline{t}^{k+1} - 0.618(\overline{t}^{k+1} - \underline{t}^{k+1}) \end{pmatrix}, \quad (3)$$

and $$U(\underline{t}^k, \overline{t}^k, t_1^k, t_2^k) \equiv \begin{pmatrix} \underline{t}^{k+1} = t_1^k, \overline{t}^{k+1} = \overline{t}^k, t_1^{k+1} = t_2^k \\ t_2^{k+1} = \underline{t}^{k+1} + 0.618(\overline{t}^{k+1} - \underline{t}^{k+1}) \end{pmatrix}, \quad (4)$$

wherein $\underline{t}^k$ and $\overline{t}^k$ are the upper bound and the lower bound of the searching interval under the k times searching, and $t_1^k$ and $t_2^k$ are the test points of the searching interval under the k times searching, as shown in FIG. 5.

The 3D sound localization evaluating module 330 calculates fitness of each of the test points using the formula (5). The formula (5) is represented as:

$$error_1 = \frac{\sqrt{(x-x_1)^2 + (y-y_1)^2 + (z-z_1)^2} - \sqrt{(x-x_2)^2 + (y-y_2)^2 + (z-z_2)^2}}{v_{sound}} - \tau_{12}. \quad (5)$$

The 3D sound localization evaluating module 330 obtains fitness values (fitness value=min(f (x, y))) of each of the test points using the formula (6) and the fitness values are compared each other. The formula (6) is represented as:

$$f(x, y) = \text{sum}(\text{abs}(error)) \quad (6)$$

The 3D sound localization evaluating module 330 determines whether a convergence condition is reached according to the fitness values of each of the test points, and, if the convergence condition is reached, generates a positioning result of the target object.

The present invention uses MATLAB to simulate the positioning result of the target object, the maximum angle error is all within 0.8 degrees, and 98% of the positioning errors are all below 10%.

Figure 7:
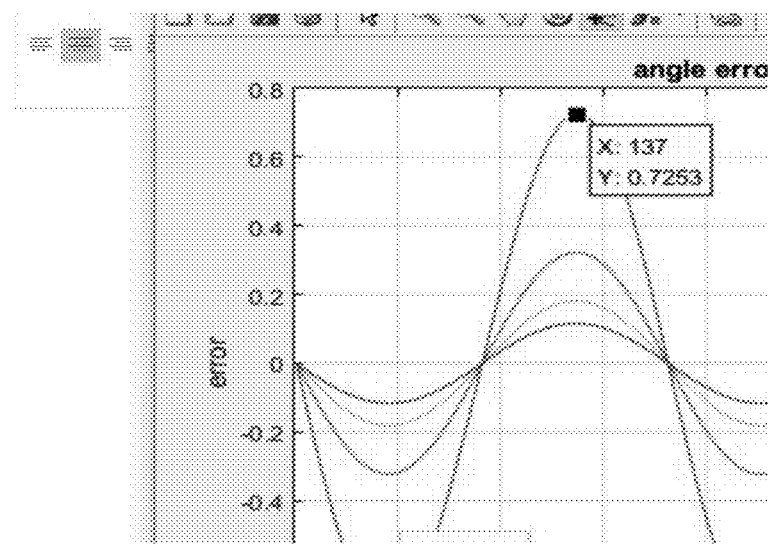
FIG. 7 illustrates diagrams of an embodiment of simulation results of azimuth angles of a target object at different distances of the preset disclosure.
Figure 8:
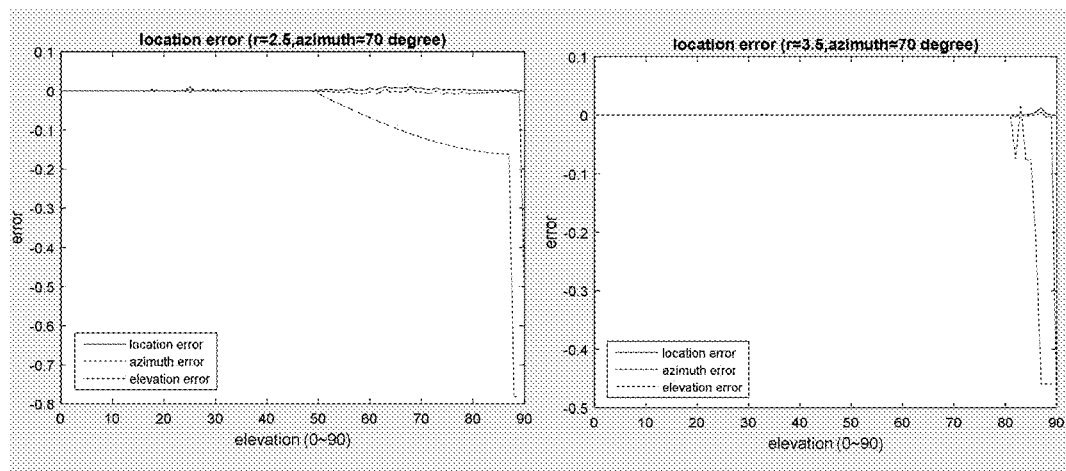
FIG. 8 illustrates diagrams of an embodiment of simulation results of elevation angles of the target object at different distances of the preset disclosure.
Figure 9:
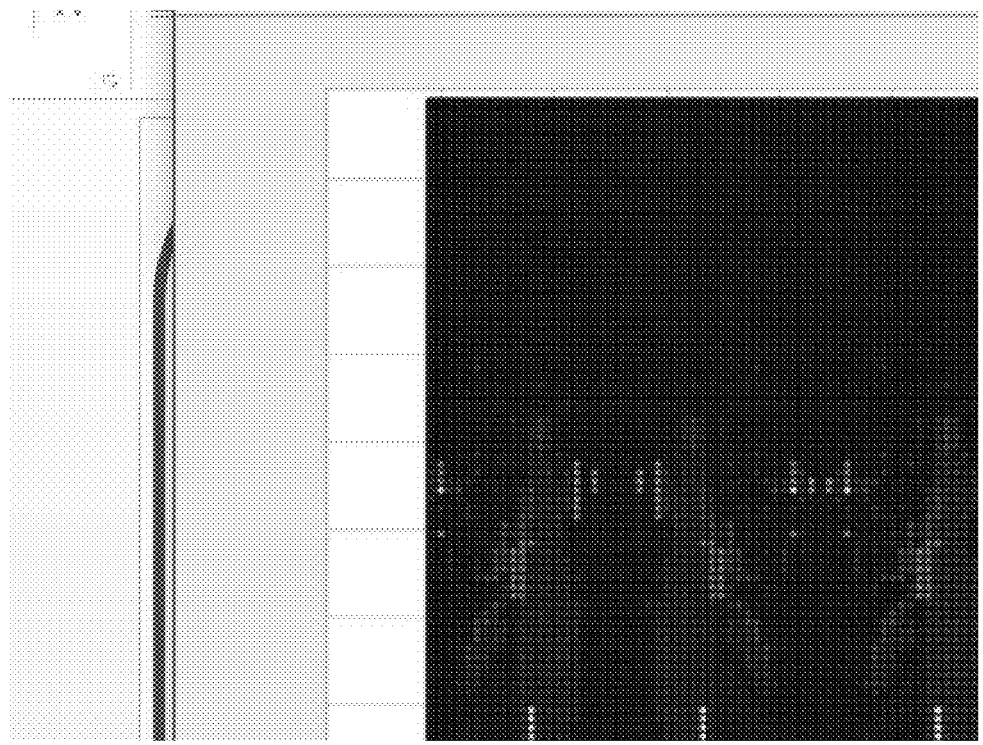
FIG. 9 is a diagram of an embodiment of simulation results of the target object in a 3D space of the preset disclosure.

FIG. 7 is a schematic diagram of an embodiment of a simulation result of azimuth angles of a target object under different distances of the preset disclosure. FIG. 8 is a schematic diagram of an embodiment of a simulation result of elevation angles of the target object under different distances of the preset disclosure. FIG. 9 is a schematic diagram of an embodiment of a simulation result of the target object in a 3D space of the preset disclosure, in which, at a fixed distance of 6 meters, positioning is performed for elevation angles of 0-90 degrees and horizontal angles of 0-180 degrees.

In order to verify the convergence speed and positioning accuracy of the 3D sound localization method of the present invention, a Particle Swarm Optimization (PSO) algorithm is applied to simulate the sound localization. The number of iterations is set to 10, PSO is 30 times, and the number of test points for each update is 7. Since the number of the test points is only 7, the PSO algorithm has not yet completed convergence after 30 iterations, and its positioning results are still constantly changing each time and it is easy to converge on the wrong coordinate point. By contrast, the 3D sound localization method of the present invention only needs 10 iterations to complete the convergence, and the accuracy rate is higher. The simulation results are shown in Table 1.

TABLE 1

| Coordinate | Distance Error (Meter) | | Elevation Angle Error (Degree) | | Azimuth Angle Error (Degree) | |
|---|---|---|---|---|---|---|
| | PSO | The Invention | PSO | The Invention | PSO | The Invention |
| (6, 3, 2) | 1.126 | 6.96e−3 | −0.029 | 0.0025 | −0.154 | 0.0003 |
| (5, 3, 2) | 0.911 | 5.49e−3 | 0.05 | 0.0003 | −0.043 | 0.0016 |
| (4, 3, 2) | 1.655 | 0.0306 | 0.046 | 0.0005 | −0.055 | 0.0023 |
| (3, 3, 2) | 1.31 | 0.0237 | −0.109 | 0.0012 | −0.151 | 0.0004 |
| (2, 3, 2) | 1.763 | 4.36e−3 | 0.061 | −0.0004 | −0.058 | 0.0004 |
| (2, 2, 3) | 1.74 | 0.0263 | −0.327 | −0.0022 | 0.296 | −0.0043 |
| (2, 3, 3) | 1.744 | 0.0113 | −0.196 | −0.0021 | −0.134 | −0.0003 |
| (2, 4, 3) | 1.403 | 4.61e−3 | −0.098 | 0.0004 | 0.073 | −0.0003 |
| (2, 5, 3) | 1.337 | 5.51e−3 | −0.314 | −0.0024 | −0.065 | −0.0016 |
| (2, 6, 3) | 1.394 | 7.02e−3 | 0.104 | 0.0018 | −0.149 | 0.0006 |
| Average | 1.438 | 0.0126 | −0.0812 | −0.00004 | −0.044 | −0.00009 |

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:

1. A three-dimensional (3D) sound localization method executable by an electronic device, comprising:
   evaluating distances between a target object and at least one set of miniature stereo microphones, where the set of the miniature stereo microphones comprise at least 3 miniature stereo microphones;
   distinguishing a quadrant in which the target object is located;
   evaluating multiple elevation angles of the target object according to spatial coordinates of each of the microphones;
   evaluating multiple azimuth angles of the target object according to the spatial coordinates of each of the microphones;
   setting searching intervals of distance variables between the target object and each of the microphones;
   generating multiple test points according to the elevation angles, the azimuth angles and the searching intervals of the distance variables;
   calculating fitness of each of the test points;
   obtaining fitness values of each of the test points and comparing the fitness values between each of the test points;
   determining whether a convergence condition is reached according to the fitness values of each of the test points; and
   if the convergence condition is reached, generating a positioning result of the target object.

2. The method of claim 1, further comprising:
   evaluating the elevation angles of the target object according to the spatial coordinates of the microphones using the formula (1), and the error of each of the elevation angles is between plus and minus 5 degrees, wherein the formula (1) is represented as:

$$\cos^{-1}\left(\frac{\cos\left(90 - \cos^{-1}\left(\sqrt{1 - \left(\frac{D_{mic_m - source} - D_{mic_n - source}}{D_{mic_m - mic_n}}\right)^2}\right)\right)}{\cos(\theta_{ele})}\right) \quad (1)$$

$$\theta_{ele} = \cos^{-1}\left(\sqrt{1 - \left(\frac{D_{mic_m - source} - D_{mic_n - source}}{D_{mic_m - mic_n}}\right)^2}\right),$$

wherein D represents a distance between the target object and each of the miniature stereo microphones, m>0 and n>0.

3. The method of claim 2, further comprising:
   evaluating the azimuth angles of the target object according to the spatial coordinates of the microphones using the formula (2), and the error of each of the azimuth angles is between plus and minus 5 degrees, wherein the formula (2) is represented as:

$$\theta_{ele} = \cos^{-1}\left(\sqrt{1 - \left(\frac{D_{mic_m - source} - D_{mic_n - source}}{D_{mic_m - mic_n}}\right)^2}\right) \quad (2)$$

$$\phi_{azi} = \cos^{-1}\left(\frac{\cos\left(90 - \cos^{-1}\left(\sqrt{1 - \left(\frac{D_{mic_m - source} - D_{mic_n - source}}{D_{mic_m - mic_n}}\right)^2}\right)\right)}{\cos(\theta_{ele})}\right),$$

wherein D represents a distance between the target object and each of the miniature stereo microphones, m>0 and n>0.

4. The method of claim 1, further comprising:
   generating 8 test points according to the elevation angles, the azimuth angles and the searching intervals of the distance variables using the formulas (3) and (4), wherein the formulas (3) and (4) are represented as:

$$L(\underline{t}^k, \overline{t}^k, t_1^k, t_2^k) \equiv \begin{pmatrix} \underline{t}^{k+1} = \underline{t}^k, \overline{t}^{k+1} = t_2^k, t_2^{k+1} = t_1^k \\ t_1^{k+1} = \overline{t}^{k+1} - 0.618(\overline{t}^{k+1} - \underline{t}^{k+1}) \end{pmatrix}; \quad (3)$$

and $$U(\underline{t}^k, \overline{t}^k, t_1^k, t_2^k) \equiv \begin{pmatrix} \underline{t}^{k+1} = t_1^k, \overline{t}^{k+1} = \overline{t}^k, t_1^{k+1} = t_2^k \\ t_2^{k+1} = \underline{t}^{k+1} + 0.618(\overline{t}^{k+1} - \underline{t}^{k+1}) \end{pmatrix}, \quad (4)$$

wherein $\underline{t}^k$ and $\overline{t}^k$ are the upper bound and the lower bound of the searching interval under the k times searching, and $t_1^k$ and $t_2^k$ are the test points of the searching interval under the k times searching.

5. The method of claim 1, further comprising:
   calculating the fitness of each of the test points using the formula (5), wherein the formula (5) is represented as:

$$error_1 = \frac{\sqrt{(x - x_1)^2 + (y - y_1)^2 + (z - z_1)^2} - \sqrt{(x - x_2)^2 + (y - y_2)^2 + (z - z_2)^2}}{v_{sound}} - \tau_{12}. \quad (5)$$

6. The method of claim 1, further comprising:
   obtaining the fitness values of each of the test points using the formula (6), wherein the formula (6) is represented as:

$$f(x, y) = sum(abs(error)) \quad (6).$$

7. An electronic device, comprising:
   a distance evaluating module, configured to evaluate distances between a target object providing a sound source and at least one set of miniature stereo microphones, where the set of the miniature stereo microphones comprise at least 3 miniature stereo microphones;
   a three-dimensional (3D) sound angle evaluating module, configured to distinguish a quadrant in which the target object is located, evaluate multiple elevation angles of the target object according to spatial coordinates of each of the microphones, and evaluate multiple azimuth angles of the target object according to the spatial coordinates of each of the microphones; and
   a 3D sound localization evaluating module, configured to set searching intervals of distance variables between the target object and each of the microphones, generate multiple test points according to the elevation angles, the azimuth angles and the searching intervals of the distance variables, calculate fitness of each of the test points, obtain fitness values of each of the test points and comparing the fitness values between each of the test points, determine whether a convergence condition is reached according to the fitness values of each of the test points, and, if the convergence condition is reached, generate a positioning result of the target object.

8. The electronic device of claim 7, wherein the 3D sound angle evaluating module is further configured to evaluate the elevation angles of the target object according to the spatial coordinates of the microphones using the formula (1), and the error of each of the elevation angles is between plus and minus 5 degrees, wherein the formula (1) is represented as:

$$\theta_{ele} = \cos^1\left(\sqrt{1-\left(\frac{D_{mic_m-source} - D_{mic_n-source}}{D_{mic_m-mic_n}}\right)^2}\right), \quad (1)$$

where D represents a distance between the target object and each of the miniature stereo microphones, m>0 and n>0.

9. The electronic device of claim 8, wherein the 3D sound angle evaluating module is further configured to evaluate the azimuth angles of the target object according to the spatial coordinates of the microphones using the formula (2), and the error of each of the azimuth angles is between plus and minus 5 degrees, wherein the formula (2) is represented as:

$$\phi_{azi} = \cos^1\left(\frac{\cos\left(90 - \cos^1\left(\sqrt{1-\left(\frac{D_{mic_m-source} - D_{mic_n-source}}{D_{mic_m-mic_n}}\right)^2}\right)\right)}{\cos(\theta_{ele})}\right), \quad (2)$$

where D represents a distance between the target object and each of the miniature stereo microphones, m>0 and n>0.

10. The electronic device of claim 7, wherein the 3D sound localization evaluating module is further configured to generate 8 test points according to the elevation angles, the azimuth angles and the searching intervals of the distance variables using the formulas (3) and (4), wherein the formulas (3) and (4) are represented as:

$$L(\underline{t}^k, \overline{t}^k, t_1^k, t_2^k) \equiv \begin{pmatrix} \underline{t}^{k+1} = \underline{t}^k, \overline{t}^{k+1} = t_2^k, t_2^{k+1} = t_1^k \\ t_1^{k+1} = \overline{t}^{k+1} - 0.618(\overline{t}^{k+1} - \underline{t}^{k+1}) \end{pmatrix}; \quad (3)$$

and $$U(\underline{t}^k, \overline{t}^k, t_1^k, t_2^k) \equiv \begin{pmatrix} \underline{t}^{k+1} = t_1^k, \overline{t}^{k+1} = \overline{t}^k, t_1^{k+1} = t_2^k \\ t_2^{k+1} = \underline{t}^{k+1} + 0.618(\overline{t}^{k+1} - \underline{t}^{k+1}) \end{pmatrix}, \quad (4)$$

wherein $\underline{t}^k$ and $\overline{t}^k$ are the upper bound and the lower bound of the searching interval under the k times searching, and $t_1^k$ and $t_2^k$ are the test points of the searching interval under the k times searching.

11. The electronic device of claim 7, wherein the 3D sound localization evaluating module is further configured to calculate the fitness of each of the test points using the formula (5), wherein the formula (5) is represented as:

$$error_1 = \frac{\sqrt{(x-x_1)^2 + (y-y_1)^2 + (z-z_1)^2} - \sqrt{(x-x_2)^2 + (y-y_2)^2 + (z-z_2)^2}}{v_{sound}} - \tau_{12}. \quad (5)$$

12. The electronic device of claim 7, wherein the 3D sound localization evaluating module is further configured to obtain the fitness values of each of the test points using the formula (6), wherein the formula (6) is represented as:

$$f(x, y) = \text{sum}(\text{abs}(error)) \quad (6).$$

13. A computer program product for execution on a system operatively connected with a block chain distributed network, the computer program product for using the block chain distributed network for mapping aliases, the computer program product comprising at least one non-transitory computer-readable medium having computer-readable program code portions embodied therein, the computer-readable program code portions comprising:
   an executable portion configured to evaluate distances between a target object providing a sound source and at least one set of miniature stereo microphones, where the set of the miniature stereo microphones comprise at least 3 miniature stereo microphones;
   an executable portion configured to distinguish a quadrant in which the target object is located;
   an executable portion configured to evaluate multiple elevation angles of the target object according to spatial coordinates of each of the microphones;
   an executable portion configured to evaluate multiple azimuth angles of the target object according to the spatial coordinates of each of the microphones;
   an executable portion configured to set searching intervals of distance variables between the target object and each of the microphones;
   an executable portion configured to generate multiple test points according to the elevation angles, the azimuth angles and the searching intervals of the distance variables;
   an executable portion configured to calculate fitness of each of the test points;
   an executable portion configured to obtain fitness values of each of the test points and comparing the fitness values between each of the test points;
   an executable portion configured to determine whether a convergence condition is reached according to the fitness values of each of the test points; and
   an executable portion configured to, if the convergence condition is reached, generate a positioning result of the target object.

14. The computer program product of claim 13, further comprising:
   an executable portion configured to evaluate the elevation angles of the target object according to the spatial coordinates of the microphones using the formula (1), and the error of each of the elevation angles is between plus and minus 5 degrees, wherein the formula (1) is represented as:

$$\theta_{ele} = \cos^1\left(\sqrt{1-\left(\frac{D_{mic_m-source} - D_{mic_n-source}}{D_{mic_m-mic_n}}\right)^2}\right), \quad (1)$$

where D represents a distance between the target object and each of the miniature stereo microphones, m>0 and n>0.

15. The computer program product of claim 14, further comprising:
   an executable portion configured to evaluate the azimuth angles of the target object according to the spatial coordinates of the microphones using the formula (2), and the error of each of the azimuth angles is between plus and minus 5 degrees, wherein the formula (2) is represented as:

$$\phi_{azi} = \cos^{-1}\left(\frac{\cos\left(90 - \cos^{-1}\left(\sqrt{1 - \left(\frac{D_{mic_m-source} - D_{mic_n-source}}{D_{mic_m-mic_n}}\right)^2}\right)\right)}{\cos(\theta_{ele})}\right), \quad (2)$$

where D represents a distance between the target object and each of the miniature stereo microphones, m>0 and n>0.

16. The computer program product of claim 13, further comprising:
an executable portion configured to generate 8 test points according to the elevation angles, the azimuth angles and the searching intervals of the distance variables using the formulas (3) and (4), wherein the formulas (3) and (4) are represented as:

$$L(\underline{t}^k, \bar{t}^k, t_1^k, t_2^k) \equiv \begin{pmatrix} \underline{t}^{k+1} = \underline{t}^k, \bar{t}^{k+1} = t_2^k, t_2^{k+1} = t_1^k \\ t_1^{k+1} = \bar{t}^{k+1} - 0.618(\bar{t}^{k+1} - \underline{t}^{k+1}) \end{pmatrix}; \quad (3)$$

and $$U(\underline{t}^k, \bar{t}^k, t_1^k, t_2^k) \equiv \begin{pmatrix} \underline{t}^{k+1} = t_1^k, \bar{t}^{k+1} = \bar{t}^k, t_1^{k+1} = t_2^k \\ t_2^{k+1} = \underline{t}^{k+1} + 0.618(\bar{t}^{k+1} - \underline{t}^{k+1}) \end{pmatrix}, \quad (4)$$

wherein $\underline{t}^k$ and $\bar{t}^k$ are the upper bound and the lower bound of the searching interval under the k times searching, and $t_1^k$ and $t_2^k$ are the test points of the searching interval under the k times searching.

17. The computer program product of claim 13, further comprising:
an executable portion configured to calculate the fitness of each of the test points using the formula (5), wherein the formula (5) is represented as:

$$error_1 = \frac{\sqrt{(x-x_1)^2 + (y-y_1)^2 + (z-z_1)^2} - \sqrt{(x-x_2)^2 + (y-y_2)^2 + (z-z_2)^2}}{v_{sound}} - \tau_{12}. \quad (5)$$

18. The computer program product of claim 13, further comprising:
an executable portion configured to obtain the fitness values of each of the test points using the formula (6), wherein the formula (6) is represented as:

$f(x, y) = \text{sum}(\text{abs}(\text{error}))$ \quad (6).

* * * * *